(12) United States Patent
Shatdal et al.

(10) Patent No.: US 8,943,040 B1
(45) Date of Patent: Jan. 27, 2015

(54) USING A TABLE TO TRACK WHETHER A DYNAMIC PARTITIONING CONDITION EVALUATES TO TRUE

(75) Inventors: Ambuj Shatdal, Madison, WI (US); B. Anantha Subramanian, Karnataka (IN); Ahmad Said Ghazal, Redondo Beach, CA (US)

(73) Assignee: Teradota US, Inc., Dayton, OH (US)

( * ) Notice: Subject to any disclaimer, the term of this patent is extended or adjusted under 35 U.S.C. 154(b) by 991 days.

(21) Appl. No.: 12/731,787

(22) Filed: Mar. 25, 2010

Related U.S. Application Data (63) Continuation-in-part of application No. 12/277,580, filed on Nov. 25, 2008.

(51) Int. Cl.
  *G06F 17/30* (2006.01)
(52) U.S. Cl.
  USPC .......................................................... 707/713
(58) Field of Classification Search
  USPC ................................................ 707/713, 759
  See application file for complete search history.

(56) References Cited

U.S. PATENT DOCUMENTS

| | | | |
|---|---|---|---|
| 6,192,358 B1 * | 2/2001 | Fuh et al. | 707/999.002 |
| 6,505,187 B1 | 1/2003 | Shatdal | |
| 6,816,853 B1 * | 11/2004 | Agarwal et al. | 707/714 |
| 7,779,008 B2 * | 8/2010 | Dageville et al. | 707/737 |
| 2002/0032676 A1 * | 3/2002 | Reiner et al. | 707/3 |
| 2006/0190947 A1 * | 8/2006 | Ghosh et al. | 719/313 |
| 2007/0078813 A1 * | 4/2007 | Beavin et al. | 707/2 |
| 2007/0078826 A1 * | 4/2007 | Bozkaya et al. | 707/3 |

OTHER PUBLICATIONS

A. Shatdal, "Order Based Analysis Functions in NCR Teradata Parallel RDBMS," EDBT 2000, LNCS 1777, pp. 219-223 (2000).
IT News Online, "Teradata Announces General Availability of Teradata 13," dated Aug. 4, 2009 (4 pages).
Teradata, "Teradata Tools and Utilities," Release 13.0, B035-2029-088C, Nov. 2009 (122 pages).

* cited by examiner

*Primary Examiner* — Yuk Ting Choi
(74) *Attorney, Agent, or Firm* — Trop, Pruner & Hu, P.C.

(57) ABSTRACT

A query to perform an ordered analytic function contains a clause specifying creation of dynamic partitions, where the clause contains a partitioning condition to specify the dynamic partitions. During processing of the query, dynamic partitions are identified based on evaluating the partitioning condition. To identify the dynamic partitions, a first table is created that contains a first column to track rows of an input table for indicating whether the partitioning condition evaluates to true. The first column of the first table is used to identify the dynamic partitions.

24 Claims, 4 Drawing Sheets

| cond_value | cumecond |
|---|---|
| 0 | 0 |
| 1 | 1 |
| 0 | 1 |
| 0 | 1 |
| 0 | 1 |
| 1 | 2 |
| 0 | 2 |
| 1 | 3 |

FIG. 3

| Table a | |
|---|---|
| Quantity | Date |
| 1 | D1 |
| 2 | D1 |
| 3 | D1 |
| 4 | D1 |
| 108 | D1 |

| Table b | |
|---|---|
| Quantity | Date |
| 1 | D1 |
| 2 | D1 |
| 108 | D1 |
| 3 | D1 |
| 4 | D1 |

USING A TABLE TO TRACK WHETHER A DYNAMIC PARTITIONING CONDITION EVALUATES TO TRUE

CROSS REFERENCE TO RELATED APPLICATIONS

This is a continuation-in-part of U.S. Ser. No. 12/277,580 filed Nov. 25, 2008, which is hereby incorporated by reference.

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

In a relational database management system, ordered analytic functions are often used, where an ordered analytic function refers to a function that contains an order specification (specifying an order based on one or more attributes, e.g., sorting based on the one or more attributes) or an expression that performs some predetermined analysis, such as ranking, computing a moving average within some window size, calculating a cumulative total, calculating a percentile, and so forth.

For windowed aggregates, SQL defines a PARTITION BY clause that allows such ordered analytic functions to be computed on multiple distinct partitions of the data determined by the value of one or more columns contained in the PARTITION BY clause. However, the partitions defined by the PARTITION BY clause are static partitions, which provide relatively limited flexibility.

SUMMARY

In general, according to an embodiment, a query to perform an ordered analytic function contains a clause specifying creation of dynamic partitions, where the clause contains a partitioning condition to specify the dynamic partitions. During processing of the query, dynamic partitions are identified based on evaluating the partitioning condition. To identify the dynamic partitions, a first table is created that contains a first column to track rows of an input table for indicating whether the partitioning condition evaluates to true. The first column of the first table is used to identify the dynamic partitions.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

A technique according to some embodiments enables the performance of ordered analytic functions with dynamic partitioning. The technique involves the use of database queries to perform the ordered analytic functions, where such queries contain clauses that specify creation of dynamic partitions. Each clause for specifying creation of dynamic partitions contains a dynamic partitioning condition that when evaluated to true identifies a corresponding dynamic partition.

The dynamic partitioning condition can be based on any column that can be present in a Structured Query Language (SQL) query, such as the SELECT statement. Whenever the partitioning condition is evaluated to true, then a new partition is created and the ordered analytic function computation proceeds on the new partition. In processing the query containing the dynamic partition clause, the partitioning condition typically will evaluate to true multiple times to produce multiple corresponding dynamic partitions.

The following is an exemplary SQL SELECT statement for performing an ordered analytic function with dynamic partitioning:

SELECT AGGR1(x) OVER (PARTITION BY p
   ORDER BY o ROWS ...
   RESET WHEN cond(a, b, c))
FROM T1;

In the example query above, an aggregation (AGGR1) is specified for column x of Table T1. In the foregoing query, AGGR1(x) is an example window function that is used to perform some type of an aggregation based on the attribute x of Table T1 within a current dynamic partition, as specified by the RESET WHEN clause of the foregoing query. The ORDER clause is an order specification. The PARTITION BY clause in the example query defines static partitions based on attribute p in Table T1. The ORDER BY clause orders rows according to attribute o.

The RESET WHEN clause, which is part of the ordered analytic function specification, specifies the dynamic partitioning condition for identifying dynamic partitions. Note that the RESET WHEN clause contained in a given SQL statement is statically specified; in other words, the partitioning condition of the RESET WHEN clause is not dynamic. Instead, it is the partitions specified by the partitioning condition that are created dynamically based on run-time evaluation of the partitioning condition. The dynamic partitioning condition is specified by cond(a, b, c), where cond (partitioning condition) is an expression that can be evaluated to true, false, or unknown, and a,b,c, are attributes of Table T1. If cond(a, b, c) evaluates to true, then a new dynamic partition is created; however, if cond(a, b, c) does not evaluate to true (i.e., the condition evaluates to false or unknown), then a new dynamic partition is not created.

In accordance with some embodiments, a derived table is created that has at least a first column to track rows of an input table for indicating whether or not the dynamic partitioning condition evaluates to true. Although reference is made to "first" column, note that such a column is not necessarily the first physical or logical column of the derived table, but in fact can be any of the columns of the derived table. The phrase "derived table" is intended to refer to any table, whether temporary or not, that is a relational table to allow for ease of access. As further discussed below, the derived table includes additional columns for use in tracking other expressions of a query that performs an ordered analytic function with dynamic partitioning.

Moreover, in some cases, an additional nested derived table may have to be created, which is referred to as an "inner derived table." In this case, there will be a first derived table and an inner derived table. The inner derived table is created in the situation where the RESET WHEN clause specifies one or more aggregates or ordered analytic functions. The inner derived table is employed to evaluate the aggregates or ordered analytic functions within the RESET WHEN clause.

Figure 1:
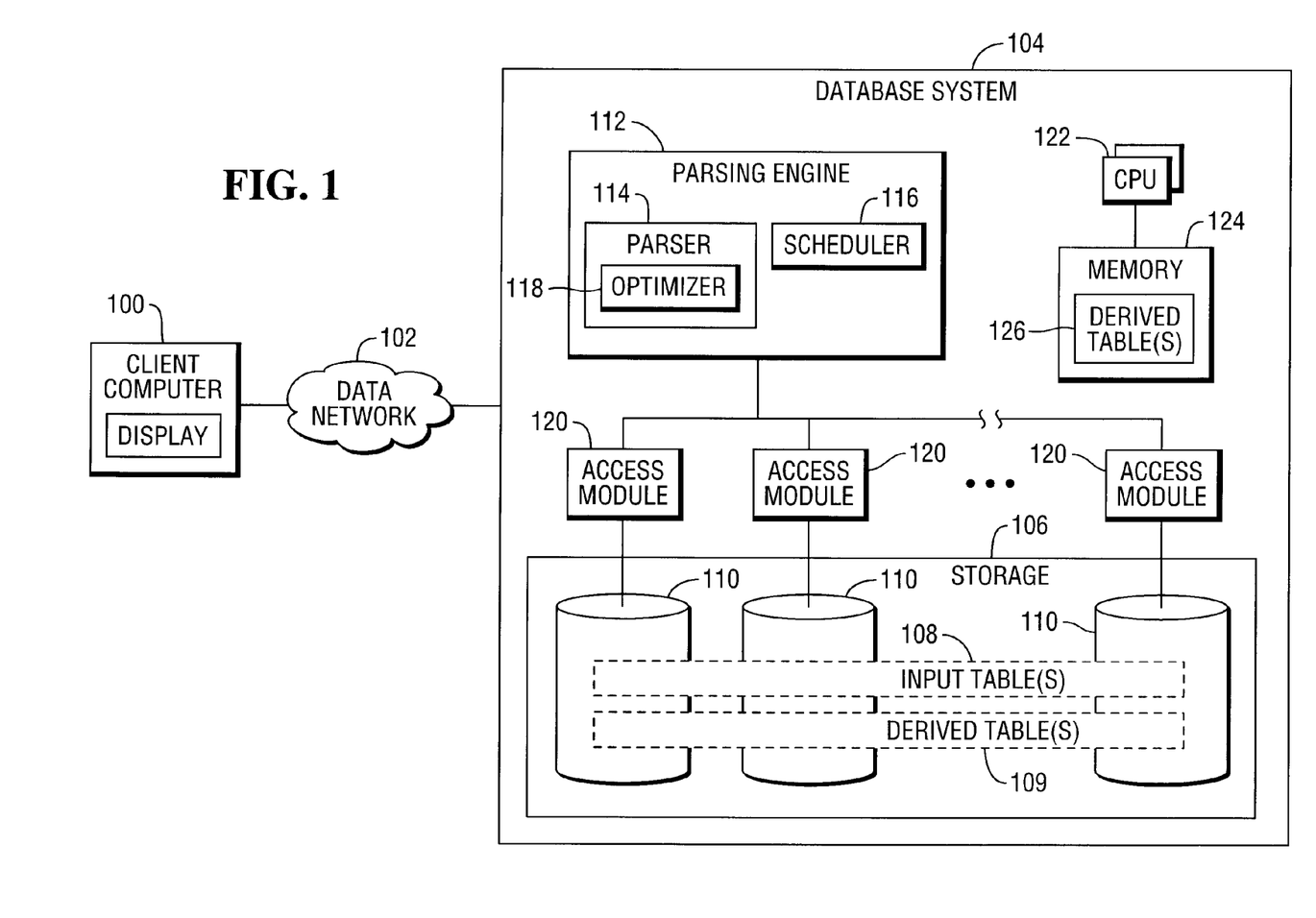
FIG. 1 is a block diagram of an example database system in which some embodiments of the invention can be incorporated.

FIG. 1 illustrates an example arrangement in which a client station (or plural client stations) 100 is (are) coupled to a database system 104 over a data network 102. Examples of the data network 102 include a local area network (LAN), a wide area network (WAN), the Internet, and so forth. Each client station 100 (e.g., computer, personal digital assistant, electronic appliance, etc.) is capable of issuing queries according to a standard database query language to the database system 104 to access or update data or to create or alter data structures (e.g., tables, databases, views, and so forth). One example of a standard database query language is SQL, as promulgated by the American National Standards Institute (ANSI).

The database system 104 includes a storage subsystem 106 that stores various data, including input relational tables 108. Each input relational table 108 contains rows and columns. The storage subsystem 106 includes plural storage modules 110, which can be physical storage devices or logical representations of partitions of the storage subsystem 106. The storage subsystem 106 also stores derived table(s) 109 as noted above, for evaluating expressions of a database query that performs an ordered analytic function with dynamic partitioning.

The database system 104 also includes a parsing engine 112, which has a parser 114 and a scheduler 116. The parser 114 receives database queries (such as those submitted by the client stations 100), parses each received query, and generates executable steps for the parsed query. The parser 114 includes an optimizer 118 that generates query plans in response to a query, selecting the most efficient from among the plural query plans. The scheduler 116 sends the executable steps generated by the parser 114 to multiple access modules 120 in the database system 104.

Each access module 120 performs the following tasks: inserts, deletes, or modifies contents of tables; creates, modifies, or deletes definitions of tables; retrieves information from definitions and tables; and locks databases and tables. In one example, each access module 120 is based on an access module processor (AMP) used in some TERADATA® database systems from Teradata Corporation. Each access module 120 manages access of data in respective storage modules 110. The presence of multiple access modules 120 and corresponding storage modules 110 define a parallel database system. In alternative embodiments, instead of database systems having multiple access modules, a database system with only one access module can be employed.

The access modules 120 and parsing engine 112 are part of the database software executable in the database system 104. The database software is executable on one or more central processing units (CPUs) 122 of the database system 104. The CPU(s) 122 is (are) connected to a memory 124. In the example of FIG. 1, the memory 124 can store derived table(s) 126, which are in-memory version(s) of the derived table(s) 109 in the persistent storage subsystem 106.

In the example of FIG. 1, the components of the database system 104 are depicted as being part of one computer node. Note that the database system 104 can actually be implemented in a multi-computer node system, where each computer node contains one or more access modules 120 and parsing engines 112 to provide a distributed database architecture.

Alternatively, instead of a parallel or multi-processing system as depicted in FIG. 1, a uni-processor system can be provided. As used herein, a "computer system" refers to a single-node system or a multi-node system.

As discussed above, one type of query that can be received by the database system 104 is a query for performing an ordered analytic function and that contains a clause that specifies dynamic partitioning, in accordance with some embodiments. The parsing engine 112 is able to perform tasks in response to receipt of such a query.

As further noted above, the first column of a first derived table is created for tracking rows of an input table for indicating whether the dynamic partitioning condition of a query for performing an ordered analytic function with dynamic partitioning evaluates to true, false, or unknown. This first column is referred to as a CUMECOND column, in one example. To allow for use of the first derived table (as well as any inner derived table), the received query that performs an ordered analytic function with dynamic partitioning is rewritten into a different form that specifies one or more columns of the first and inner derived tables. The example query noted above is set forth again below:

SELECT AGGR1(x) OVER (PARTITION BY p
  ORDER BY o ROWS . . .
  RESET WHEN cond(a, b, c))
FROM T1;

In accordance with some embodiments, the foregoing example query can be rewritten as:

SELECT AGGR1(x) OVER (PARTITION BY p, CUMECOND ORDER
  BY o ROWS ...)
FROM (SELECT x, p, o,
  SUM(COND_VALUE) OVER (
    PARTITION BY p
    ORDER BY o
    ROWS UNBOUNDED PRECEDING) AS CUMECOND
  FROM (SELECT x, p, o,
    CASE WHEN cond(a, b, c) THEN 1 ELSE 0 END
  as COND_VALUE
    FROM T1) tmp1) tmp2;

The variable COND_VALUE as specified in the rewritten query above evaluates to true ("1") if cond(a, b, c) evaluates to true, and to "0" if cond(a, b, c) evaluates to false or unknown. COND_VALUE is then summed to produce the CUMECOND column of the first derived table. Basically, according to the summing, each time the dynamic condition evaluates to true (COND_VALUE="1"), CUMECOND is incremented by the value 1. Thus, CUMECOND when incremented identifies the beginning of a new dynamic partition.

Figure 2:
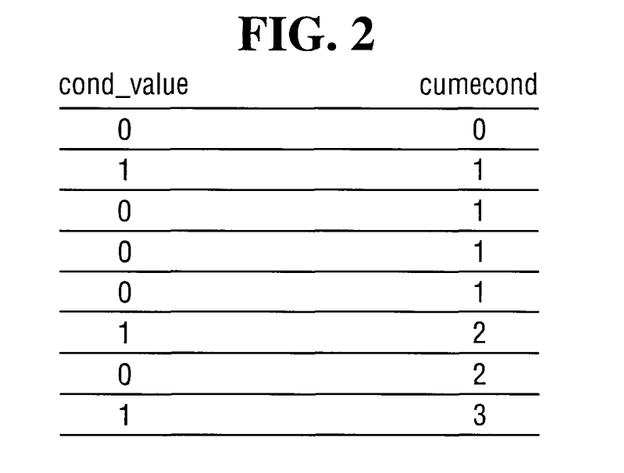
FIG. 2 illustrates example values of columns of a first derived table according to some embodiments.

FIG. 2 provides an illustration of the foregoing. The value of COND_VALUE varies between "0" and "1" depending on whether the dynamic partitioning condition of a corresponding row of an input table evaluates to false/unknown or true, respectively. Each time COND_VALUE evaluates to "1", the column CUMECOND is incremented. In the example of FIG. 2, CUMECOND starts at 0, increments to 1 in the second row, stays at 1 for three more rows, then increments to 2 in response to the next occurrence of COND_VALUE evaluating to "1". The column CUMECOND is again incremented to 3 the next time COND_VALUE evaluates to "1". Thus, in the example of FIG. 2, four dynamic partitions are identified (corresponding to the four CUMECOND values 0-3).

Also there could be situations when the ORDER BY column (o in the example query above) is not distinct and different from the window aggregate expression (AGGR1(x) in the example above). Due to the non-distinctness of the ORDER BY column, the ordering of rows could be different when evaluated within the derived table and when evaluated for the main window function.

Figure 3:
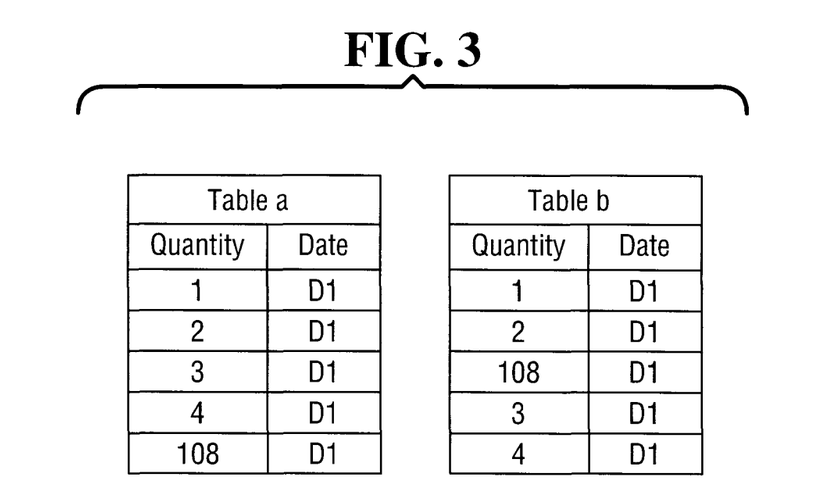
FIG. 3 illustrates ordering of rows of two tables.

This is illustrated using FIG. 3, which depicts Table a and Table b, where one of Table a and Table b is the derived table and the other of table a and Table b is the input table against which the main window function is applied.

If the ORDER BY column (o) is distinct from x in the aggregate expression AGGR1(x), then both Table a and Table b have valid ordering based on the ORDER BY column. Assuming Table b is the ordering within the derived table, row 3 would be marked as the row triggering a new partition (provided that the partitioning condition has evaluated to true). However, if Table a is the ordering used for a final statistical function computation, it may be incorrect to assume that a new partition has been triggered from the third row. To handle this case, a new field of the derived table is provided to track the ordering of rows within the derived table and to reproduce the ordering of rows in the derived table in the outer context (for the computation of the aggregated expression, for example). This additional row for tracking the ordering of rows within the derived table is column CONDORDER in the first derived table.

The CONDORDER column of the first derived table can be expressed as follows:
SUM(1) OVER (PARTITION BY p
 ROWS BETWEEN UNBOUNDED PRECEDING AND CURRENT ROW
 ORDER BY o);

In some cases, the RESET WHEN clause can also specify aggregates and/or ordered analytic functions, which are considered nested aggregates and/or ordered analytic functions. These aggregates and/or ordered analytic functions have to be evaluated first before the RESET WHEN clause can be evaluated. To do so, an inner derived table is created, where the inner derived table contains columns corresponding to the nested aggregates and/or ordered analytic functions. The original query can then be rewritten to refer to the inner derived table to obtain results of the nested aggregated and/or ordered analytic functions.

Figure 4:
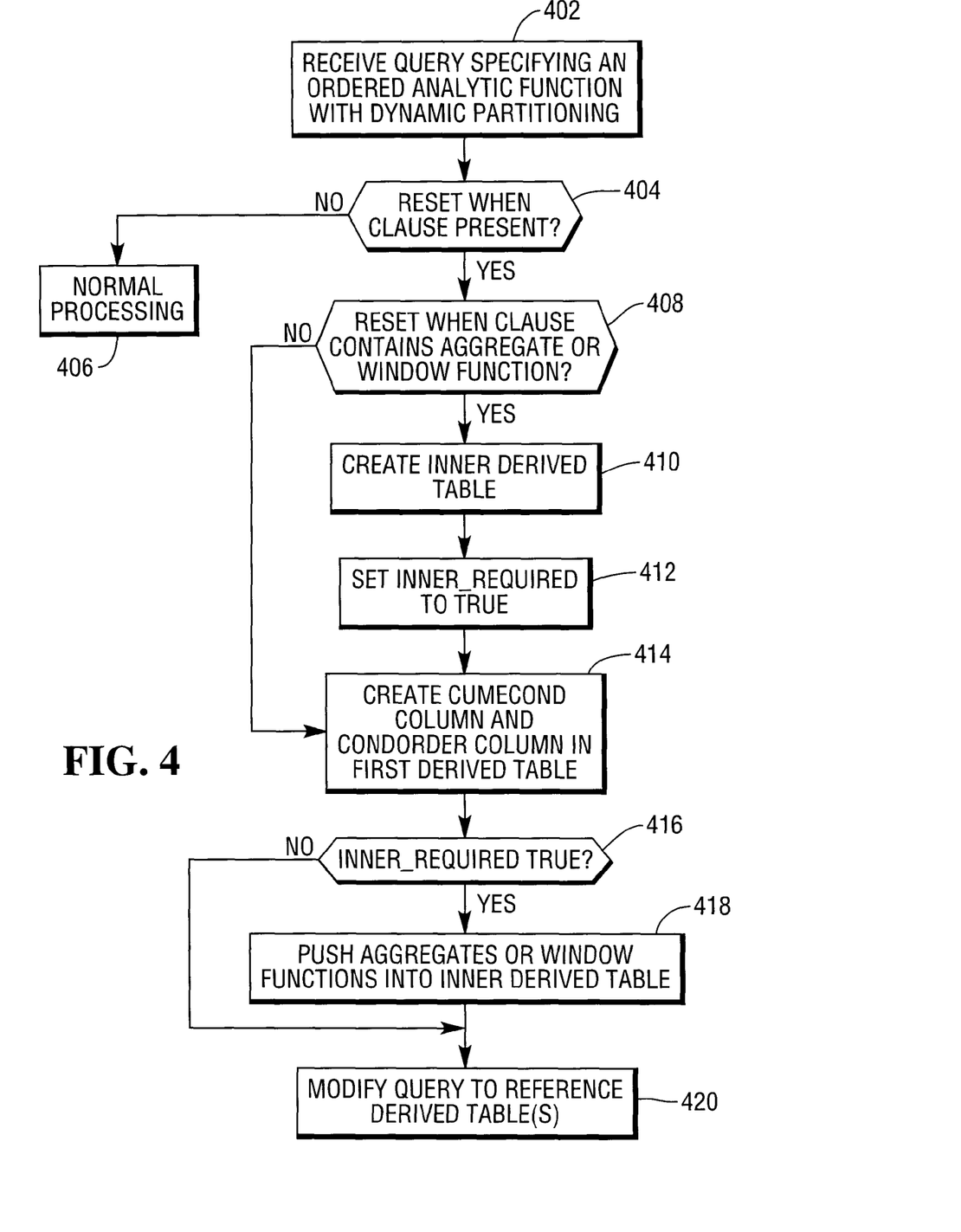
FIG. 4 is a flow diagram of a process of performing an ordered analytic function with dynamic partitioning, according to an embodiment.

FIG. 4 is a flow diagram of a procedure according to an embodiment. The procedure can be performed by the database system 104 of FIG. 1. A query specifying an ordered analytic function with dynamic partitioning is received (at 402), such as by the parsing engine 112 of the database system 104 of FIG. 1. The database query may be submitted by the client station 100 shown in FIG. 1, or by another source.

The procedure determines (at 404) whether the received database query contains a RESET WHEN clause. If no RESET WHEN clause is present, then normal processing of the database query is performed (at 406). However, if a RESET WHEN clause is present, then the procedure next determines (at 408) whether the RESET CLAUSE contains an aggregate and/or a window function. If so, then an inner derived table is created (at 410), and an INNER_REQUIRED flag is set (at 412) to true. The INNER_REQUIRED flag is used to indicate that the inner derived table should be accessed for processing the database query specifying the ordered analytic function with dynamic partitioning.

Next, following the processing at 408 (and conditionally 410 and 412), the procedure proceeds to create (at 414) the CUMECOND column and the CONDORDER column of the first derived table. Next, the procedure determines (at 416) whether the INNER_REQUIRED flag is true. If so, then any aggregates or window functions in the RESET WHEN clause are pushed (at 418) into the inner derived table. Basically, these aggregates and/or window functions are pushed as corresponding columns into the inner derived table, where the corresponding columns are used to evaluate the aggregates and/or window functions in the RESET WHEN clause. The query is modified (at 420) to reference the columns of the first derived table and conditionally the inner derived table.

Figure 5:
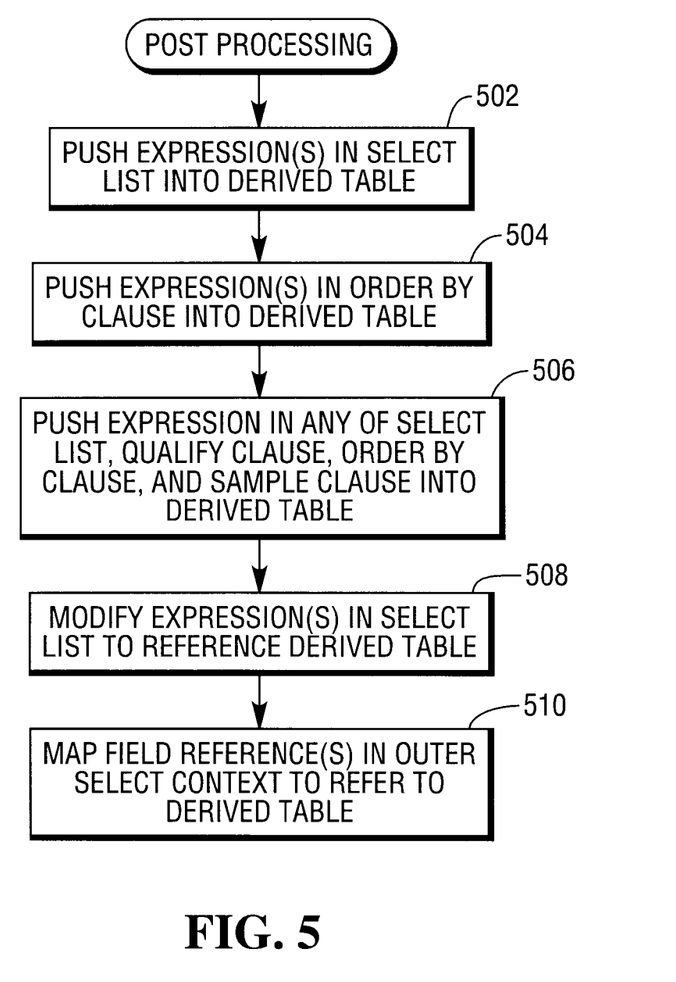
FIG. 5 is a flow diagram of a post-processing process according to an embodiment.

FIG. 5 is a flow diagram of a process of post processing the database query when the RESET WHEN clause is present. The database query contains a SELECT list as well as an ORDER BY clause. Any expression in the SELECT list that does not have a RESET WHEN window function is pushed (at 502) into the first or inner derived table, depending on whether the expression is nested or not. Each expression in the ORDER BY clause that does not have any RESET WHEN window function is also pushed (at 504) into the first or inner derived table.

Any expression in the SELECT list, QUALIFY clause, ORDER BY clause, and SAMPLE clause which correspond to an aggregate or window function are also pushed (at 506) into the first or inner derived table. Note that there may be other clauses that can be pushed, such as the WHERE clause, HAVING clause, GROUP BY clause, any tables listed in a FROM clause, and so forth.

The expressions in the SELECT list are then modified (at 508) to reference the first and inner derived tables that have been created as part of the RESET WHEN rewrite. Tasks 502, 508 cause relevant aggregates and non-RESET WHEN window functions to be evaluated earlier in the derived tables for semantic correctness. However, there could still be field references in the outer SELECT context that would have to be pushed and mapped to refer to the derived table entries. This is performed at 510.

The following provides an example of rewriting an original database query, as follows:
SELECT SUM(sales) OVER (ORDER BY quarter
 RESET WHEN sales IS NOT NULL
 ROWS BETWEEN UNBOUNDED PRECEDING AND CURRENT ROW)
FROM TABLE;

After the processing specified above in FIG. 5, the database query is rewritten as follows:

```
SELECT SUM( sales ) OVER ( PARTITION BY CUMECOND
    ORDER BY CONDORDER
    ROWS BETWEEN UNBOUNDED PRECEDING AND
    CURRENT ROW)
FROM
(
SELECT SUM(
  CASE
    WHEN sales is NOT NULL THEN 1
    ELSE 0
  END) OVER (
    ORDER BY quarter
    ROWS BETWEEN UNBOUNDED PRECEDING AND
    CURRENT ROW) AS CUMECOND,
SELECT SUM(1) over(
    ORDER BY quarter
    ROWS BETWEEN UNBOUNDED PRECEDING AND
    CURRENT ROW ) as CONDORDER, sales
FROM TABLE ) as INNER_DERIVED_TABLE;
```

By using techniques or mechanisms according to some embodiments, a systematic approach of evaluating dynamic partitions or windows is provided that can use existing database system infrastructure.

Instructions of software described above (including the parsing engine 112 and access modules 120 of FIG. 1) are loaded for execution on a processor (such as one or more CPUs 122 in FIG. 1). The processors can include microprocessors, microcontrollers, processor modules or subsystems (including one or more microprocessors or microcontrollers), or other control or computing devices. As used here, a "processor" can refer to a single component or to plural components (e.g., one CPU or multiple CPUs in one or multiple computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer system, comprising:
receiving a query to perform an ordered analytic function, wherein the query contains a clause specifying creation of dynamic partitions, and wherein the clause contains a partitioning condition to specify the dynamic partitions, where the clause is of a type different from a PARTITION BY clause; and
during processing of the query, identifying, by the computer system, the dynamic partitions based on evaluating the partitioning condition, wherein identifying the dynamic partitions comprises:
creating a first table containing a first column to track rows of an input table for indicating whether the partitioning condition evaluates to true; and
using the first column of the first table to identify the dynamic partitions.

2. The method of claim 1, further comprising rewriting the received query to a new query that specifies the creating and using tasks.

3. The method of claim 1, wherein receiving the query comprises receiving the query that further contains a PARTITION BY clause to specify static partitions in addition to the clause specifying creation of dynamic partitions.

4. The method of claim 1, wherein the clause to specify creation of dynamic partitions comprises a RESET WHEN clause.

5. The method of claim 1, wherein the clause contains at least one aggregate or window function, the method further comprising:
creating a second table to evaluate the at least one aggregate or window function in the second table.

6. The method of claim 5, further comprising rewriting the received query to a new query that specifies the creating and using tasks and that refers to the second table.

7. The method of claim 1, further comprising:
providing at least another column in the first table to evaluate at least one other expression in the query.

8. The method of claim 1, further comprising:
providing a second column in the first table to aggregate values of the first column, wherein each increment of the second column indicates a new dynamic partition.

9. The method of claim 1, further comprising:
providing another column in the first table to track ordering of rows within the first table.

10. A database system comprising:
storage media to store a first relational table and a first derived table;
a processor configured to:
receive a query to perform an ordered analytic function with respect to at least the first relational table, wherein the query contains a clause specifying creation of dynamic partitions, and wherein the clause contains a partitioning condition to specify the dynamic partitions, where the clause is of a type different from a PARTITION BY clause;
use one or more columns contained in the first derived table to track rows of the first relational table for indicating whether the partitioning condition evaluates to true; and
identify the dynamic partitions using the one or more columns of the first derived table.

11. The database system of claim 10, wherein the processor is configured to further:
rewrite the received query to refer to the first derived table; and
process the rewritten query to perform the ordered analytic function.

12. The database system of claim 10, wherein the clause to specify creation of dynamic partitions comprises a RESET WHEN clause.

13. The database system of claim 10, wherein the clause contains at least one aggregate or window function, the processor configured to further:
evaluate the at least one aggregate or window function in a second derived table.

14. The database system of claim 10, wherein the one or more columns of the first derived table includes a first column and a second column, the first column for indicating whether the partitioning condition evaluates to true, false, or unknown, wherein the processor is configured to further:
use the second column in the first derived table to aggregate values of the first column, wherein each increment of the second column indicates a new dynamic partition.

15. The database system of claim 10, wherein the processor is configured to further:
provide another column in the first derived table to track ordering of rows within the first derived table.

16. The database system of claim 10, further comprising multiple computer nodes, wherein the processor includes multiple central processing units in the multiple computer nodes.

17. An article comprising at least one non-transitory computer-readable storage medium containing instructions that upon execution by a processor causes a database system to:

receive a query to perform an ordered analytic function, wherein the query contains a clause specifying creation of dynamic partitions, and wherein the clause contains a partitioning condition to specify the dynamic partitions, where the clause is of a type different from a PARTITION BY clause: and during processing of the query, identify the dynamic partitions based on evaluating the partitioning condition, wherein identifying the dynamic partitions comprises:

creating a first table containing a first column to track rows of an input table for indicating whether the partitioning condition evaluates to true; and using the first column of the first table to identify the dynamic partitions.

18. The article of claim 17, wherein the clause contains at least one aggregate or window function, and wherein the instructions upon execution cause the database system to further:

create a second table to evaluate the at least one aggregate or window function in the second table.

19. The article of claim 18, wherein the instructions upon execution cause the database system to further rewrite the received query to a new query that refers to the first and second tables.

20. The method of claim 1, wherein the clause containing the partitioning condition is not a PARTITION BY clause.

21. The method of claim 1, wherein the partitioning condition includes an expression containing plural attributes, and wherein evaluating the partitioning condition comprises evaluating the expression to at least one of a first state and a second state, wherein evaluating the expression to the first state indicates creation of a new dynamic partition, and wherein evaluating the expression to the second state indicates that a new dynamic partition is not created.

22. The method of claim 1, further comprising providing a result of the query in a result table, wherein the result is produced using the first column of the first table to identify the dynamic partitions.

23. The database system of claim 10, wherein the clause containing the partitioning condition is not a PARTITION BY clause.

24. The database system of claim 10, wherein the partitioning condition includes an expression containing plural attributes, and wherein the processor is configured to further evaluate the expression to at least one of the true state and a false state, wherein evaluating the expression to the true state indicates creation of a new dynamic partition, and wherein evaluating the expression to the false state indicates that a new dynamic partition is not created.

* * * * *

UNITED STATES PATENT AND TRADEMARK OFFICE
CERTIFICATE OF CORRECTION

| | | |
|---|---|---|
| PATENT NO. | : 8,943,040 B1 | Page 1 of 1 |
| APPLICATION NO. | : 12/731787 | |
| DATED | : January 27, 2015 | |
| INVENTOR(S) | : Shatdal et al. | |

It is certified that error appears in the above-identified patent and that said Letters Patent is hereby corrected as shown below:

On the title page item [73],

Insert --Teradata US, Inc.--

Delete "Teradota US, Inc."

Signed and Sealed this
Twenty-second Day of March, 2016

Michelle K. Lee
*Director of the United States Patent and Trademark Office*